United States Patent
Dorsch et al.

(10) Patent No.: US 9,486,819 B2
(45) Date of Patent: Nov. 8, 2016

(54) SYSTEM HAVING FOAM BUSTING NOZZLE AND SUB-SURFACE MIXING NOZZLE

(75) Inventors: Glenn R. Dorsch, Aberdeen, WA (US); Kent H. Keeran, Elma, WA (US)

(73) Assignee: Vaughan Company, Inc., Montesano, WA (US)

(*) Notice: Subject to any disclaimer, the term of this patent is extended or adjusted under 35 U.S.C. 154(b) by 1500 days.

(21) Appl. No.: 12/694,396

(22) Filed: Jan. 27, 2010

(65) Prior Publication Data

US 2011/0180633 A1    Jul. 28, 2011

(51) Int. Cl.
*B01F 5/10* (2006.01)
*B05B 1/26* (2006.01)
*B05B 13/06* (2006.01)
*B05B 7/00* (2006.01)

(52) U.S. Cl.
CPC ........... *B05B 1/267* (2013.01); *B05B 13/0627* (2013.01); *B05B 7/0018* (2013.01)

(58) Field of Classification Search
CPC ........................................................ B01F 5/10
USPC ............... 366/136, 137, 165.1, 165.2, 165.4, 366/165.5, 173.2, 175.2; 239/521
See application file for complete search history.

(56) References Cited

U.S. PATENT DOCUMENTS

| | | | |
|---|---|---|---|
| 238,295 A | | 3/1881 | Killam |
| 598,601 A | | 2/1898 | Higbee |
| 626,950 A | * | 6/1899 | Wheelwright ................ 366/134 |
| 1,043,644 A | * | 11/1912 | Thomas ..................... 366/175.2 |
| 1,536,230 A | | 5/1925 | McCue |
| 1,642,933 A | | 9/1927 | McGrath |
| 2,236,791 A | | 4/1941 | Forsberg |
| 2,628,204 A | | 2/1953 | Gray |
| 3,176,697 A | | 4/1965 | Gibson |
| 4,327,867 A | | 5/1982 | Jones et al. |
| 4,846,582 A | | 7/1989 | Davidsson |
| 7,025,492 B2 | | 4/2006 | Dorsch et al. |
| 7,628,183 B2 | | 12/2009 | Dorsch et al. |
| 2007/0068597 A1 | * | 3/2007 | Dorsch et al. ................ 141/286 |

* cited by examiner

*Primary Examiner* — David Sorkin

(74) *Attorney, Agent, or Firm* — Bishop Diel & Lee, Ltd.

(57) ABSTRACT

A surface foam diffuser system having a first nozzle disposed above a top surface of the at least partially liquid contents, a splash plate positioned adjacent to the first nozzle outlet, and a second nozzle disposed below the top surface of the at least partially liquid contents is disclosed for suppressing foaming in large processing tanks. The system nozzles each have an inlet for receiving pressurized liquid and an outlet for ejecting a liquid stream into the tank, the depth of the second nozzle and the direction of the liquid stream there from being such that rotation of the top surface is facilitated. The spray of the first nozzle, as dispersed by the splash plate, reduces foam on at least a portion of the top surface, with the rotation of the top surface allowing each portion of the top surface to eventually fall within the reducing spray.

25 Claims, 5 Drawing Sheets

360" FULLY ADJUSTABLE NOZZLES

SYSTEM HAVING FOAM BUSTING NOZZLE AND SUB-SURFACE MIXING NOZZLE

TECHNICAL FIELD OF THE INVENTION

The present system relates to a foam busting and sub-surface mixing configuration for use in processing tanks such as, for example, waste-water digesters. Particularly, the present system relates to a unique nozzle arrangement which provides greater foam suppression in sludge-type compositions.

BACKGROUND OF THE INVENTION

Surface foaming and sediment deposition can both create problems in storage and treatment tanks where large volumes of liquid/slurry are stored and stirred, mixed, or agitated. In many cases the two problems are inversely related. That is, solving one of the problems may directly worsen the other. This relationship can make it very difficult for those skilled in the art to design and implement a system which addresses and solves both problems.

For example, in activated sludge secondary treatment plants, slurries in large tanks are typically stirred, mixed, or agitated in order to suspend solids in the liquid prior to emptying the tank. Without such mixing, the solids would settle to the bottom of the tank. The settling of solids over even a short period of time can develop into a huge problem, as the build-up of sediment on the tank bottom reduces the volume of the tank. Other benefits of the auxiliary mixing of digester tank contents are: reduction of thermal stratification; dispersing substrate for better contact with active biomass; reduction in scum buildup; dilution of inhibitory substances or adverse pH and temperature feed characteristics; increased effective volume of the reactor; and, separation of reaction product gases is improved. However, stirring, agitation and mixing can also result in increased surface foam due to the abundance of surfactants which can be found in such liquids.

Similarly, surface foaming can be a problem in anaerobic digesters, where gases are the natural product of the digestion process. The gases create foam in the form of bubbles and/or scum on the surface of the liquid/slurry in the tank. If the foaming problem is not addressed, the foam uses up volume in the tank, or the tank can overflow. Further, agitation of the tank contents to assist the digestion process may exacerbate the foaming as noted above.

In both cases, anti-foaming agents may be added to the tanks to suppress foaming. However, these agents are expensive and, in some instances, are either too limited in their ability to suppress foaming or may have negating effects on other favored processes (e.g., digestion).

Another common problem for many activated sludge plant digesters is the creation of a thick (viscous) upper surface. This happens because thickened sludges from the aerobic digestion side of the plant get fed back into the anaerobic digesters to further break down the sludge. This makes the anaerobic digester sludge much more viscous and harder to mix, sometimes resulting in lower level tank mixing but not in upper surface mixing. Floor-mounted mixing nozzles do not necessarily assure upper surface rotation.

Mechanical anti-foaming devices, such as the nozzle system disclosed in U.S. Pat. No. 7,628,183 to Dorsch et al. and assigned to the Assignee of the present technology, are very effective at suppressing foaming. The complete disclosure of U.S. Pat. No. 7,628,183 is hereby incorporated by reference. However, without surface rotation, and due to the extensive size of digester tanks, expensive plumbing for a plurality of anti-foaming nozzles would be required to adequately suppress foaming.

The present invention overcomes these and many other disadvantages of previous devices and processes. Disclosed is a system which is effective at suppressing foaming, even during mixing, stirring and agitation, without the use of expensive anti-foaming agents and the system is easy and relatively inexpensive to manufacture and install.

SUMMARY OF THE INVENTION

There is disclosed herein an improved nozzle configuration for suppressing foaming in a treatment tank filled to a level with at least partially liquid contents which avoids the disadvantages of prior devices while affording additional structural and operating advantages.

Generally speaking, the surface foam diffuser system comprises a first nozzle disposed above a top surface of the at least partially liquid contents, a splash plate positioned adjacent to the first nozzle outlet, and a second nozzle disposed below the top surface of the at least partially liquid contents. The system nozzles each have an inlet for receiving pressurized liquid and an outlet for ejecting a liquid stream into the tank, the depth of the second nozzle and the direction of the liquid stream there from being such that rotation of the top surface is facilitated.

In a particular embodiment, the system further comprises a plurality of mixing nozzles positioned proximate a bottom surface of the tank to keep solids entrained within the liquid medium by creating a liquid flow pattern in the tank. The liquid stream from the second nozzle is preferably supportive of the established flow pattern.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
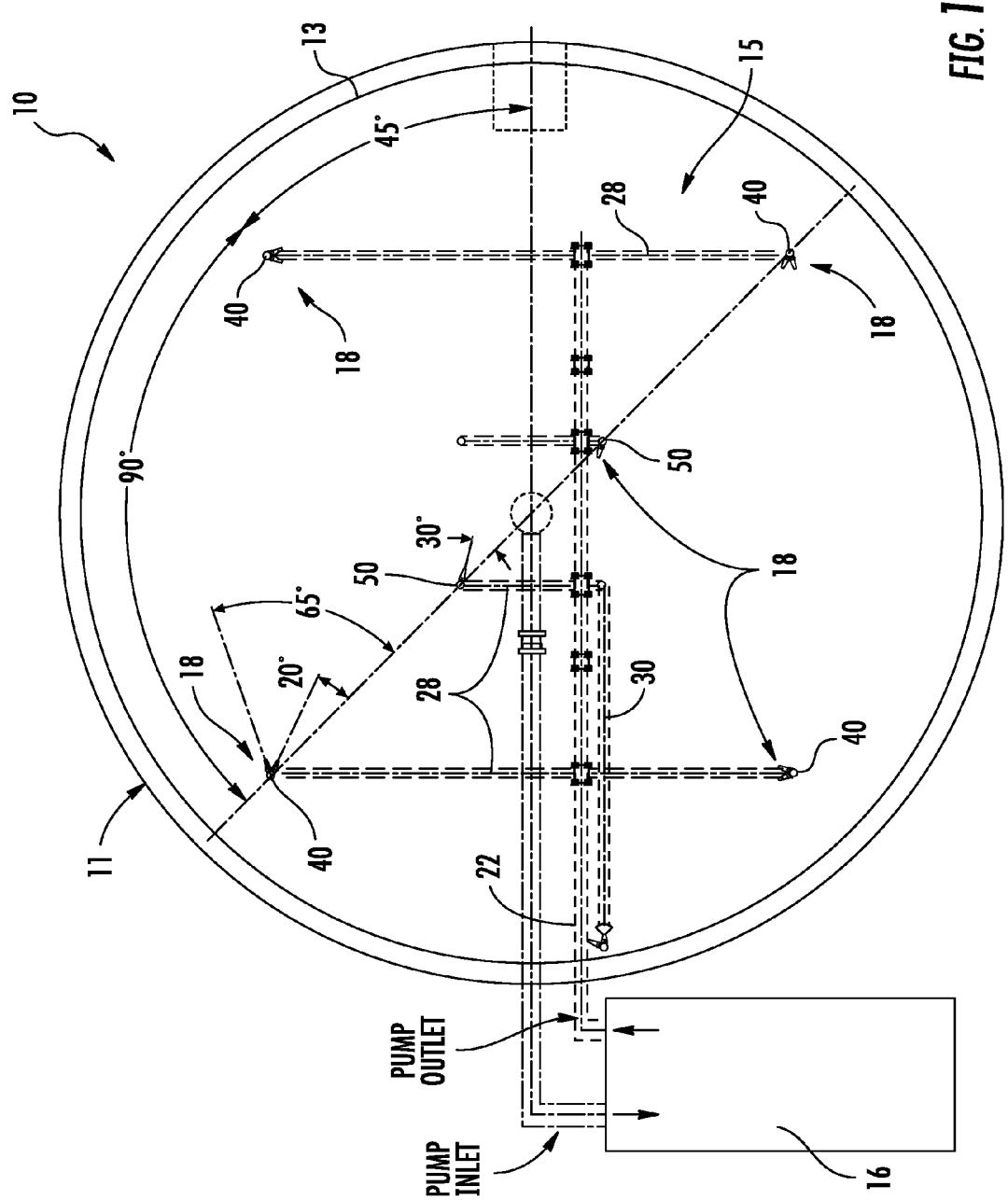
FIG. 1 is a plan view of one embodiment of the present system.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-11, there is illustrated an anti-foaming tank and nozzle system, generally designated by the numeral 10. The described system 10 is discussed with respect to mixing tank contents, which is typically a combination of liquids and solids. More specifically, however, the system 10 is described for use on very large tanks, where mixing at the surface is somewhat diminished, and for use in digesters and the like, wherein a viscous top surface, due to the formation of scum and foam, reduces surface mixing. These particular foaming and scum problems may be found anywhere large processing tanks are used, such as, but not limited to, bio-waste plants, chemical plants, water treatment plants, waste-water treatment plants and where the tank contents include a 1-6% total solids concentration.

Accordingly, the system 10 is described herein with reference to three distinct zones: tank bottom (A), content upper surface (B), and above the content surface (C). The drawings illustrate a specific embodiment of the system as used in a specific tank construction, but principles of the invention can be used for virtually any storage tank in which surface foam (including scum) may cause a problem.

Figure 2:
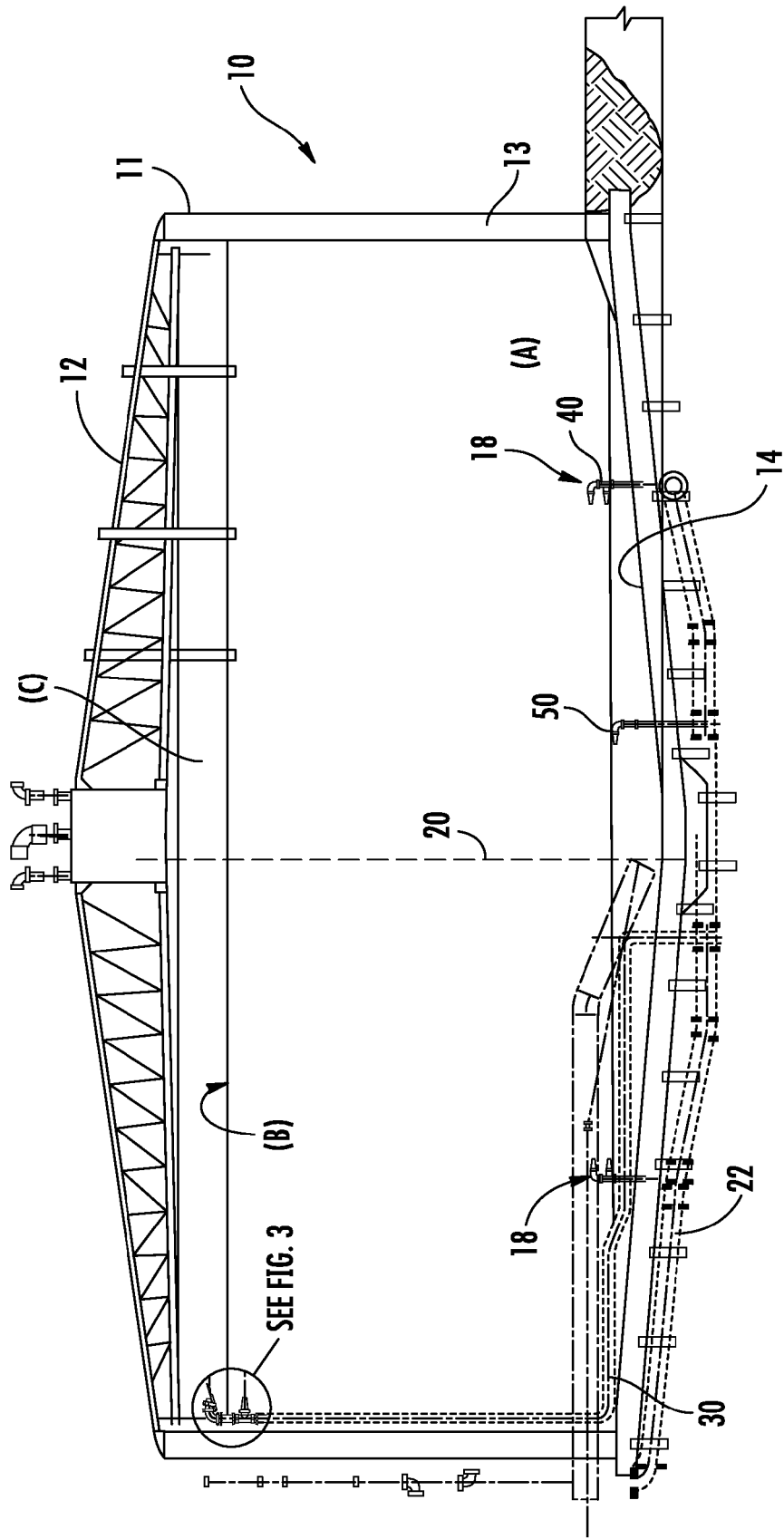
FIG. 2 is a side view of the system illustrated in FIG. 1.

In the embodiment illustrated in FIGS. 1 and 2, a tank 11 is shown to include a lid 12, a sidewall 13 and a conical base 14. The representative embodiment is used for a cylindrical digester tank having a radius of 108 feet (about 32.9 meters), a bottom cone of 4.25 feet (129.5 cm) depth, an overall depth from the bottom sidewall of 30 to 50 feet, and a mixing system including a chopper pump 16 and nozzle assemblies 18 such as those available from Vaughan Co., Inc., of Montesano, Wash., and sold under the trademark ROTA-MIXT™.

The present system 10 can be installed to achieve its defoaming effect wherever it is needed. Appropriate valves are provided at the pump 16 for directing liquid from the tank 11 to the pipe 22 and then to supply pipes 28 for the mixing system nozzle assemblies 18, and pipes 30 for the diffuser 24 and sub-surface mixing nozzle 26. By "sub-surface" it is meant that the nozzles are positioned within the tank contents below the surface within the top 30% of the content depth (e.g., not more than 3 feet deep in 10 feet of tank contents), preferably within the top 20% of the content depth, and most preferably within the top 10% of the content depth. Liquid from the tank 11 is supplied to the pump 16 by inlet piping, which can withdraw liquid from the lower center portion of the tank 11 (via a sump), and extends to the pump 16.

Figure 4:
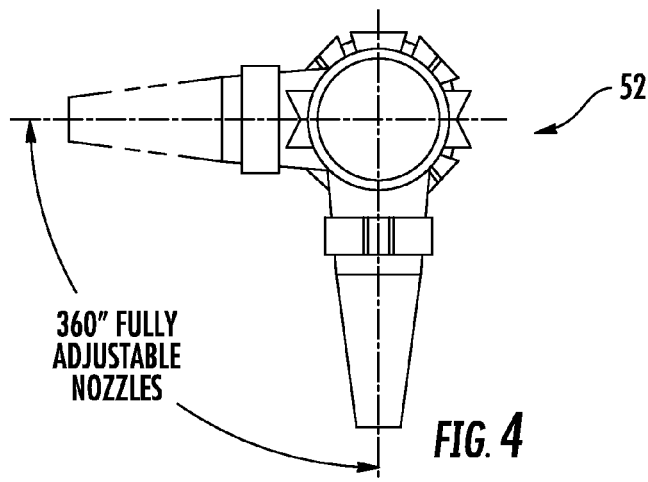
FIGS. 4-6 are various views of one embodiment of a mixing nozzle used in embodiments of the present system.
Figure 5:
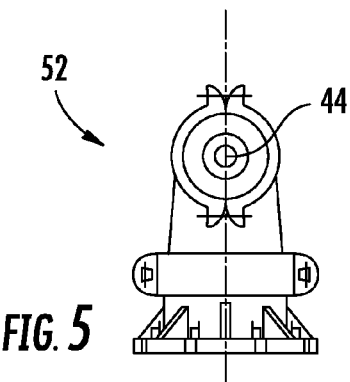
Figure 6:
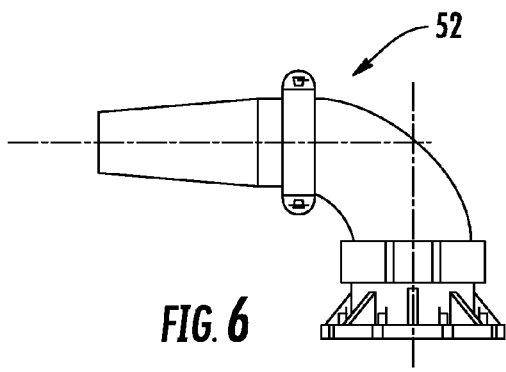
Figure 7:
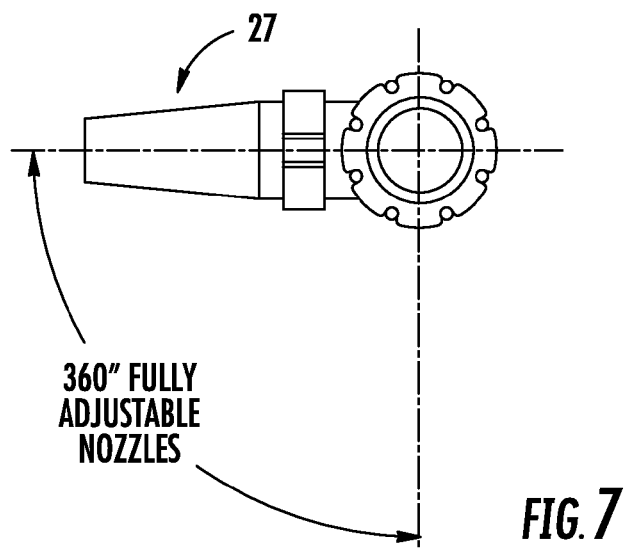
FIGS. 7-9 are various views of one embodiment of another mixing nozzle used in embodiments of the present system.

As illustrated in FIG. 1, the mixing nozzle assemblies 18 can include an inner ring of nozzles and an outer ring of nozzles positioned at the tank bottom (A), with each nozzle oriented in the same general rotational direction to induce rotation of the contents of the tank about a vertical axis 20. The outer ring preferably comprises four dual nozzle assemblies 40, while the inner ring comprises at least two single nozzle assemblies 50. The pump outlet is connected to a supply pipe 22 feeding pipes 28 to the mixing nozzle assemblies 18. The purpose of the lower mixing nozzle assemblies 18 is to create a rotational, stirring flow pattern in the tank contents. A suitable system is described in U.S. Pat. No. 7,025,492 to Dorsch et al., and assigned to Vaughan Co., Inc. or Montesano, Wash. The '492 patent is hereby incorporated by reference FIGS. 4-6 illustrate the preferred single nozzle 52 as a glass-lined ductile iron nozzle having an 8-inch inlet reduced to 6-inch at the bend before reaching a tapered outlet. Although the nozzle outlet 44 is of substantially lesser diameter than the pipes 22 and 28, nevertheless, the diameter at the outlet 44 still is much larger than conventional spray nozzles or apertures so that the nozzle will not become clogged with rags, hair, fiber, or other thick, tough, stringy, or solid material from the tank.

Figures 8, 9:
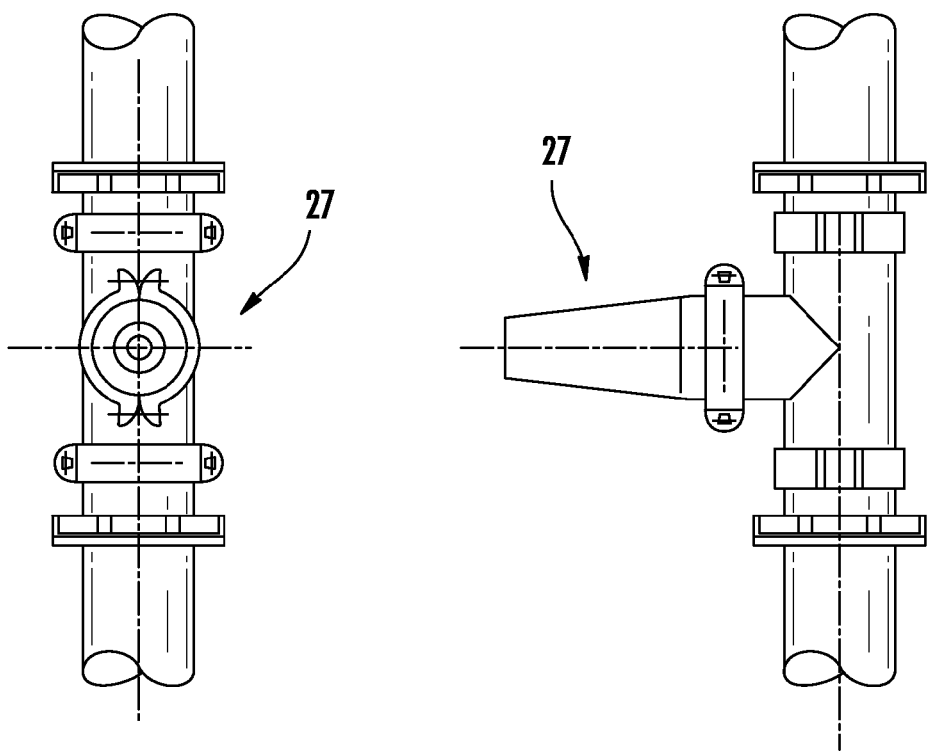

The dual nozzle assemblies 40 are created using the same single nozzle of FIG. 5 coupled to the intermediate nozzle 27 of FIG. 9. Similarly, the sub-surface nozzle 26 also utilizes the configuration illustrated in the drawings of FIGS. 7-9. The configuration of the intermediate nozzle 27 (as nozzle 26 or nozzle 52) is well-known in the field, allowing a second nozzle (e.g., diffuser nozzle 24) to be connected adjacent using the same feed pipe. The nozzles 27 and 52 should be 360° fully adjustable to allow directional positioning to create the desired stirring flow pattern within the tank 11, be it for lower tank mixing or sub-surface mixing.

As shown and described in U.S. Pat. No. 7,628,183, a diffuser can be conveniently mounted in a manhole of the type commonly used in tanks of this type. However, for the presently illustrated embodiment, the supply pipe 22 which feeds pipe 30 to the surface foam diffuser 24 and sub-surface mixing nozzle 26 is preferably located within the tank 11, running from the bottom center of the tank 11 toward the sidewall 13. The location of the diffuser 24 along the sidewall 13, of course, varies depending on the tank.

Figure 3:
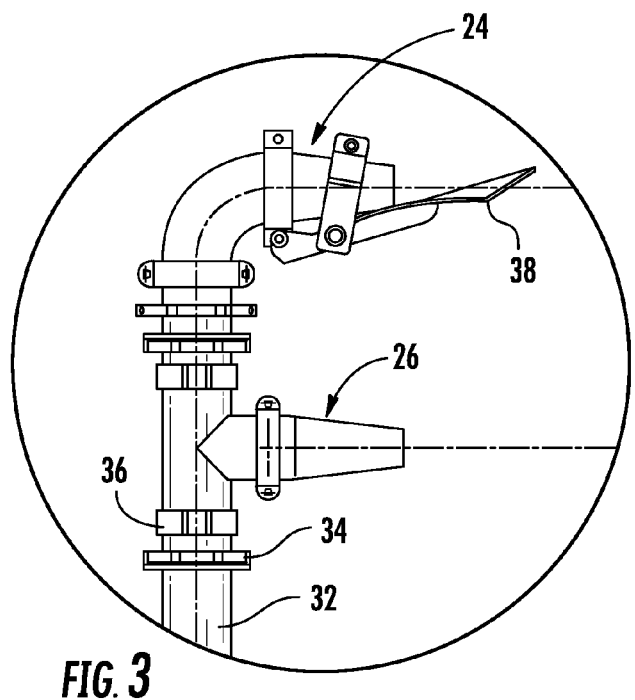
FIG. 3 is a close up view of an embodiment of a sub-surface nozzle and surface defoaming spray nozzle combination.

Referring to FIG. 2, supply pipe 22 (8-inch diameter in a representative embodiment) connects to the upright diffuser inlet pipe 30. Pipe 30 extends upward to an 8-inch to 6-inch reducer 32 to allow attachment of the 6-inch flange 34 and piping 36 of mixing nozzle 26 (FIG. 3). A diffuser nozzle 24 is then attached approximately one foot or more above the mixing nozzle 26. The mixing nozzle 26 and the diffuser nozzle 24 are identical to the nozzles described above, with the added features described below.

The outlet of the diffuser nozzle 24 is sized for a desired concentration of the liquid ejected from the nozzle, and can be 1½ inches (3.8 cm) to 2¾ inches (7.0 cm) in diameter for a representative installation. The horizontally directed stream of liquid impinges on a splash plate or deflector 38 to break the liquid stream into a reasonably uniform dispersion of droplets over a substantial area of the surface of the liquid in the tank 11 without a great upward arc which would contact the lid 12 of the tank or require that liquid be maintained at a lower level, thereby wasting room in the tank 11. For most installations, an additional four feet (1.2 meters) of "head room" is required above the diffuser nozzle 24 to allow the stream to be dispersed without contacting the tank lid 12.

Figure 10:
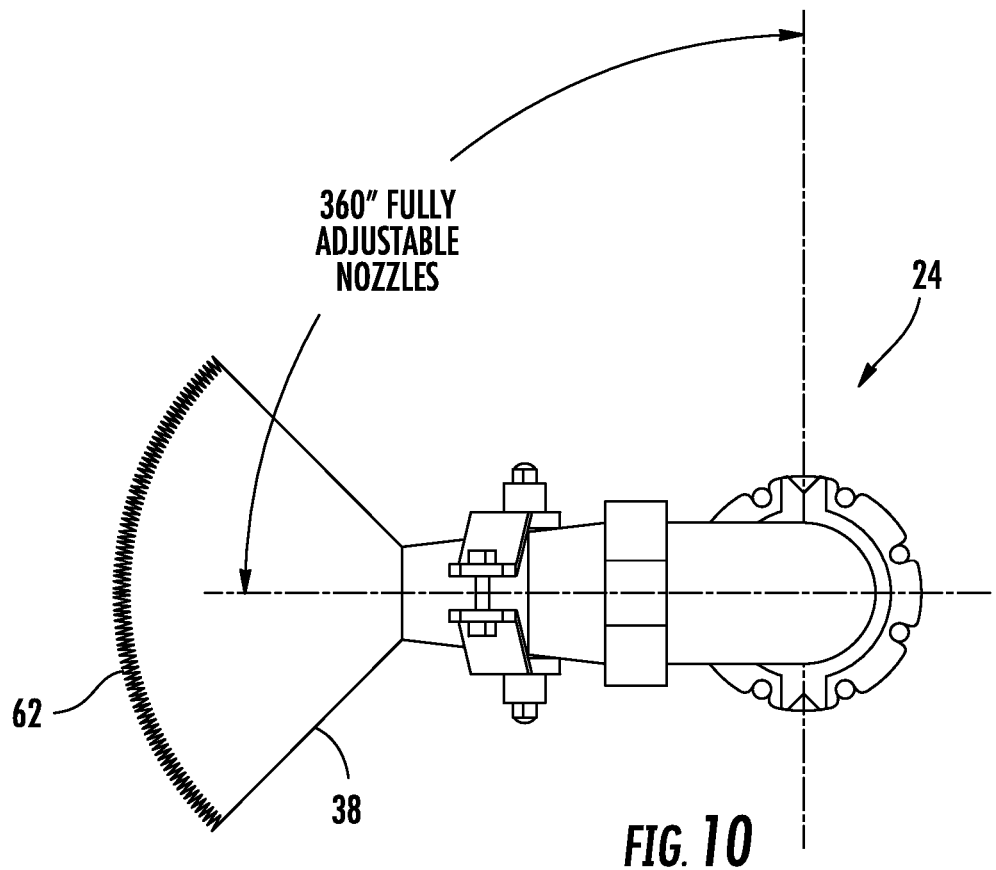
FIGS. 10 and 11 are views of one embodiment of an anti-foaming nozzle used in embodiments of the present system.
Figure 11:
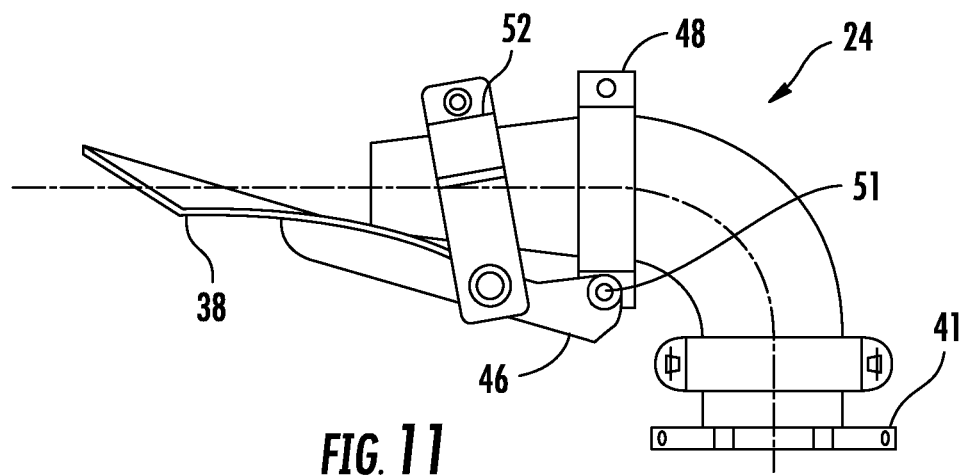

As shown in FIGS. 10 and 11, the diffuser nozzle 24 includes a standard coupling 41 to attach to the pipe 36 leading from mixing nozzle 26 (FIG. 3). The splash plate or deflector 38, described in detail below is carried by a support arm 46 pivoted to the underside of the nozzle coupling 48 by a pivot pin or bolt 51. Upright clamps 52 are attached to the support arm 46 and secure the deflector 38 to the nozzle at the desired angle.

The deflector 38 is a key component of the surface foam diffuser system 10. As noted above, it is desired that the nozzle outlet be of substantial diameter to prevent clogging. It also is desired that the exit velocity of the stream be quite high in order to reach a sizeable area. The purpose of the deflector is to break up the stream from the nozzle into droplets and disburse the droplets over a long and wide area, while minimizing the height of the spray to minimize the headroom required inside the tank 11. Many different shapes and contours have been tested, with the illustrated device constituting the current preferred embodiment.

The deflector plate 38 is angled upward from below the nozzle outlet at a small acute angle so that the horizontally directed stream of liquid from the nozzle is deflected upward without excessive loss of energy or a resulting high arc. A 10° to 20° angle of inclination, preferably about 15°, has been found to achieve the desired deflection.

The outer peripheral edge of the deflector 38 is a circular arc centered at about the nozzle outlet, and of at least 90° angular extent, preferably at least about 120°. If the shape is too narrow, the spray and droplets fall off the sides of the plate in an uncontrolled manner. In this embodiment, the radius of the arc is about 14 inches (35.6 cm), resulting in the maximum width of the "fan" being just over 21 inches (over 53.3 cm).

The outer arcuate edge is preferably formed with "saw tooth" fingers 62 bent up relative to the inner portion of the plate, preferably at an angle of about 45°. The fingers or teeth are of a sharp "V" shape having a tip radius no greater than 0.06 inch (1.5 mm), and a base radius between teeth no greater than 0.06 inch (1.5 mm). The teeth are small and closely spaced which has been found to break up the stream and spread apart the spray of droplets. A simple deflector with no teeth tends to concentrate the spray pattern at a constant radius, whereas large teeth at mixed angles and sizes break up the spray pattern, but not much water falls within a 10-foot radius of the nozzle and the pattern is not evenly distributed. The small, sharp teeth achieve a more uniform pattern. In this embodiment, the teeth are about 0.625 inch (1.59 cm) long with a pitch (tip-to-tip) of about 0.575 inch (1.46 cm), resulting in an included angle between adjustment tooth edges of about 50°.

The plate portion of the deflector 38 is not planar, but rather is curved about its center line at a radius of approximately 36 inches so that the outer corners droop downward about 2 inches (5.1 cm) with respect to the center of the deflector 38. The convex upper surface has been found to assist in disbursing the spray more evenly from side to side.

The resulting spray from the diffuser 24 may cover as much as about 50% of the top surface area of the tank contents. The sub-surface mixing nozzle 26 facilitates rotation of the top surface along with the lower mixing nozzles assembly 18 to allow for the eventual coverage of the entire top surface by the de-foaming spray.

The following TABLE illustrates the effectiveness of the present system compared to the use of chemical defoamants.

TABLE

| | Spray vs. Chemical | | |
|---|---|---|---|
| Foam Height | Increasing Concentration of Chemical Defoamant | High Level Concentration of Chemical Defoamant | Diffuser Nozzle with Sub-Surface Mixing Nozzle |
| Maximum Foam | 17 to 19+ feet above liquid level | 11 to 12 feet | 4+ feet |
| Minimum Foam | 5.5 to 6.5 feet above liquid level | 8 to 9 feet | 2 feet |
| Approx. Avg. Foam | 12 to 13 feet above liquid level | 10 feet | 3 feet |

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A combination tank and surface foam diffuser system for suppressing the formation of foam within the tank, the system comprising:

a tank having a floor and a sidewall extending from the floor to an upper edge of the tank to define a volume, the volume containing at least partially liquid contents prone to the formation of a foam as a result of at least one of aerobic digestion, anaerobic digestion, mixing, agitation and stirring, the at least partially liquid contents having a top surface where the formation of the foam is prevalent;

a source of pressurized liquid, including piping to deliver the pressurized liquid to the tank;

a first nozzle positioned in the tank above the top surface of the at least partially liquid contents of the tank and at a tank level proximate the upper edge of the tank, the nozzle having an inlet coupled to the source of pressurized liquid for receiving pressurized liquid from the source, and an outlet for ejecting a liquid stream onto the top surface of the at least partially liquid contents;

a splash plate positioned adjacent to the outlet of the first nozzle such that the liquid stream ejected from the outlet contacts the plate at an angle to thereby disperse the liquid stream in a fan-like manner to create a defoaming area on the top surface;

a second nozzle positioned within the tank below the top surface of the at least partially liquid contents and at a second tank level below and proximate the tank level of the first nozzle, the second nozzle having an inlet for receiving pressurized liquid from the source and an outlet for ejecting a liquid stream into the tank, the depth of the second nozzle and the direction of the liquid stream being such that rotation of just the top surface of the at least partially liquid contents is created to move the foam formed on the top surface into the defoaming area of the top surface; and a plurality of mixing nozzles positioned proximate the floor of the tank below the second nozzle, the plurality of mixing nozzles having an outlet directed to provide rotation of the tank substance below the top surface.

2. The combination of claim 1, wherein the source of the pressurized liquid is coupled to the second nozzle.

3. The combination of claim 1, wherein the first nozzle and the second nozzle are positioned proximate an inner periphery of the tank.

4. The combination of claim 3, wherein the outlet of the first nozzle is directed toward the center of the tank.

5. The combination of claim 1, wherein the splash plate is configured to disperse the liquid stream over at least 20% of the top surface.

6. The combination of claim 1, wherein the second nozzle is positioned at a depth of no more than 30% of the tank contents below the top surface.

7. The combination of claim 6, wherein the second nozzle is disposed at a depth of no more than 20% of the tank contents below the top surface.

8. The combination of claim 6, wherein the second nozzle is disposed at a depth of no more than 10% of the tank contents below the top surface.

9. The combination of claim 1, wherein the direction of the liquid stream from the second nozzle is supportive of the rotation of tank material created by the mixing nozzles.

10. The combination of claim 1, wherein a height of the dispersed liquid stream from the first nozzle relative to the top surface, is greater than that of the second nozzle.

11. The combination of claim 1, wherein the angle of the splash plate is about 15°.

12. The combination of claim 1, wherein the direction of the liquid stream from the first nozzle is offset from the direction of the liquid stream from the second nozzle.

13. A combination liquid holding tank and surface foam diffuser system comprising:
- a tank defined by sidewalls, an upper edge and a bottom to define a volume, the volume containing at least a partially liquid composition having a tendency to foam during at least one of aerobic digestion, anaerobic digestion, mixing, stirring, and agitation;
- a discharge line connected to the bottom of the tank;
- a pump having an inlet connected to the discharge line;
- a feed line connected to an outlet of the pump;
- a first nozzle positioned above a top surface of the substance and at a tank level proximate the upper edge of the tank, the first nozzle having an inlet for receiving pressurized liquid from the feed line and an outlet for ejecting a liquid stream in a direction toward one of either a center or a side of the tank;
- a splash plate attached to the first nozzle to contact the liquid stream at an angle of inclination relative to the stream direction to thereby disperse the liquid stream in a fan-like manner over a larger area of the top surface of the substance to create a defoaming area;
- a second nozzle positioned within the tank below the top surface of the substance and at a second tank level below and proximate the tank level of the first nozzle, the second nozzle having an inlet for receiving pressurized liquid from the feed line and an outlet for ejecting a liquid stream directly into the substance, the depth of the second nozzle, relative to the first nozzle, and the direction of the liquid stream being such that rotation of just the top surface of the at least partially liquid contents is created to move foam formed on the top surface into the defoaming area of the top surface; and
- a plurality of mixing nozzles positioned proximate the bottom of the tank below the second nozzle, the plurality of mixing nozzles having an outlet directed to provide rotation of the tank material below the top surface.

14. The combination of claim 13, wherein the tank is selected from the group of processing tanks consisting of a chemical plant tank, a bio-waste tank, a waste-water treatment tank, and a water treatment tank.

15. The combination of claim 14, wherein the tank is a waste-water treatment tank and comprises one of either an aerobic digester or an anaerobic digester.

16. The combination of claim 13, wherein the substance has a sludge content in the range of about 1 to 6% total solids concentration.

17. The combination of claim 13, wherein the first and second nozzle are connected.

18. The combination of claim 13, wherein the first nozzle and the second nozzle are positioned proximate an inner periphery of the tank.

19. The combination of claim 18, wherein the outlet of the first nozzle is directed toward the center of the tank.

20. The combination of claim 13, wherein the splash plate disperses the liquid stream over at least 20% of the top surface.

21. The combination of claim 13, wherein the second nozzle is disposed no more than one foot below the top surface.

22. The combination of claim 13, wherein the direction of the liquid stream from the first nozzle is offset from the direction of the liquid stream from the second nozzle.

23. The combination of claim 13, wherein the second nozzle is disposed at a depth of no more than 30% of the tank contents below the top surface.

24. The combination of claim 23, wherein the second nozzle is disposed at a depth of no more than 20% of the tank contents below the top surface.

25. The combination of claim 23, wherein the second nozzle is disposed at a depth of no more than 10% of the tank contents below the top surface.

* * * * *